(12) United States Patent
Chiang

(10) Patent No.: US 6,505,963 B1
(45) Date of Patent: Jan. 14, 2003

(54) ILLUMINATING RUBBING STRIP FOR A CAR

(76) Inventor: Shun-Fa Chiang, No. 307-10, Ta-Chang Rd., Kuo Hsing Hsiang, Nantou Hsien (TW)

(*) Notice: Subject to any disclaimer, the term of this patent is extended or adjusted under 35 U.S.C. 154(b) by 4 days.

(21) Appl. No.: 09/895,180

(22) Filed: Jul. 2, 2001

(51) Int. Cl.[7] ............................. F21S 8/10; F21V 9/00
(52) U.S. Cl. ....................... 362/545; 362/511; 362/245
(58) Field of Search ................................ 362/545, 501, 362/496, 245, 31, 487, 511, 540, 543, 544, 26, 27, 800

(56) References Cited

U.S. PATENT DOCUMENTS

| | | | | |
|---|---|---|---|---|
| 2,010,374 A | * | 8/1935 | Pissis | 362/511 |
| 3,454,757 A | * | 7/1969 | Bell | 362/511 |
| 4,947,293 A | * | 8/1990 | Johnson et al. | 362/545 |
| 5,193,895 A | * | 3/1993 | Naruke et al. | 362/545 |
| 5,255,164 A | * | 10/1993 | Eidelman | 362/545 |
| 6,425,679 B1 | * | 7/2002 | Yu | 362/487 |

* cited by examiner

Primary Examiner—Sandra O'Shea
Assistant Examiner—Bao Truong
(74) Attorney, Agent, or Firm—Troxell Law Office PLLC

(57) ABSTRACT

A rubbing strip for a car has a body adapted to be secured to a side face of the car and having a receiving space with an open end; a transparent cap received in the open end of the receiving space of the body and having a reflection area oppositely formed relative to the open end of the body, the reflection area having multiple reflection faces formed to enhance the reflection effect; an illuminating assembly received in the receiving space of the body and located to face the reflection faces, the illuminating assembly being composed of multiple light emitting diodes. With such an arrangement, driving safety is enhanced.

9 Claims, 8 Drawing Sheets

ILLUMINATING RUBBING STRIP FOR A CAR

BACKGROUND OF THE INVENTION

1. Field of the Invention

The present invention relates to an automobile rubbing strip, and more particularly to an illuminating rubbing strip for an automobile.

2. Description of Related Art

Safety is the most important thing for automobile drivers and that is why all cars are equipped with head lights, tail lights and signaling lights so as to show to other drivers that there is a car moving or turning. However, during the nights, in the raining days or in a big parking lot where the lighting is not sufficient to show to others that there is a car moving or turning, collisions happen from time to time. With the front lights and the tail lights, a head-on collision may be avoided when drivers keep a safety distance from others. However, when the car is turning, drivers can only tell from the blinking of the signaling light, which is far more inefficient and ineffective to warn others. Because the signaling lights takes only a small portion in the car body, drivers easily overlook the blinking of the signaling lights and tragedy happens.

To overcome the shortcomings, the present invention intends to provide an improved car rubbing strip to mitigate or obviate the aforementioned problems.

SUMMARY OF THE INVENTION

The primary objective of the invention is to provide an illuminating rubbing strip for cars, which is able to illuminate synchronously with the signaling lights so as to enhance the warning effect to others.

Another objective of the invention is to provide a decorative rubbing strip for cars, which is able to increase the attraction of cars when lit in nights.

Other objects, advantages and novel features of the invention will become more apparent from the following detailed description when taken in conjunction with the accompanying drawings.

DETAILED DESCRIPTION OF PREFERRED EMBODIMENT

Figure 1:
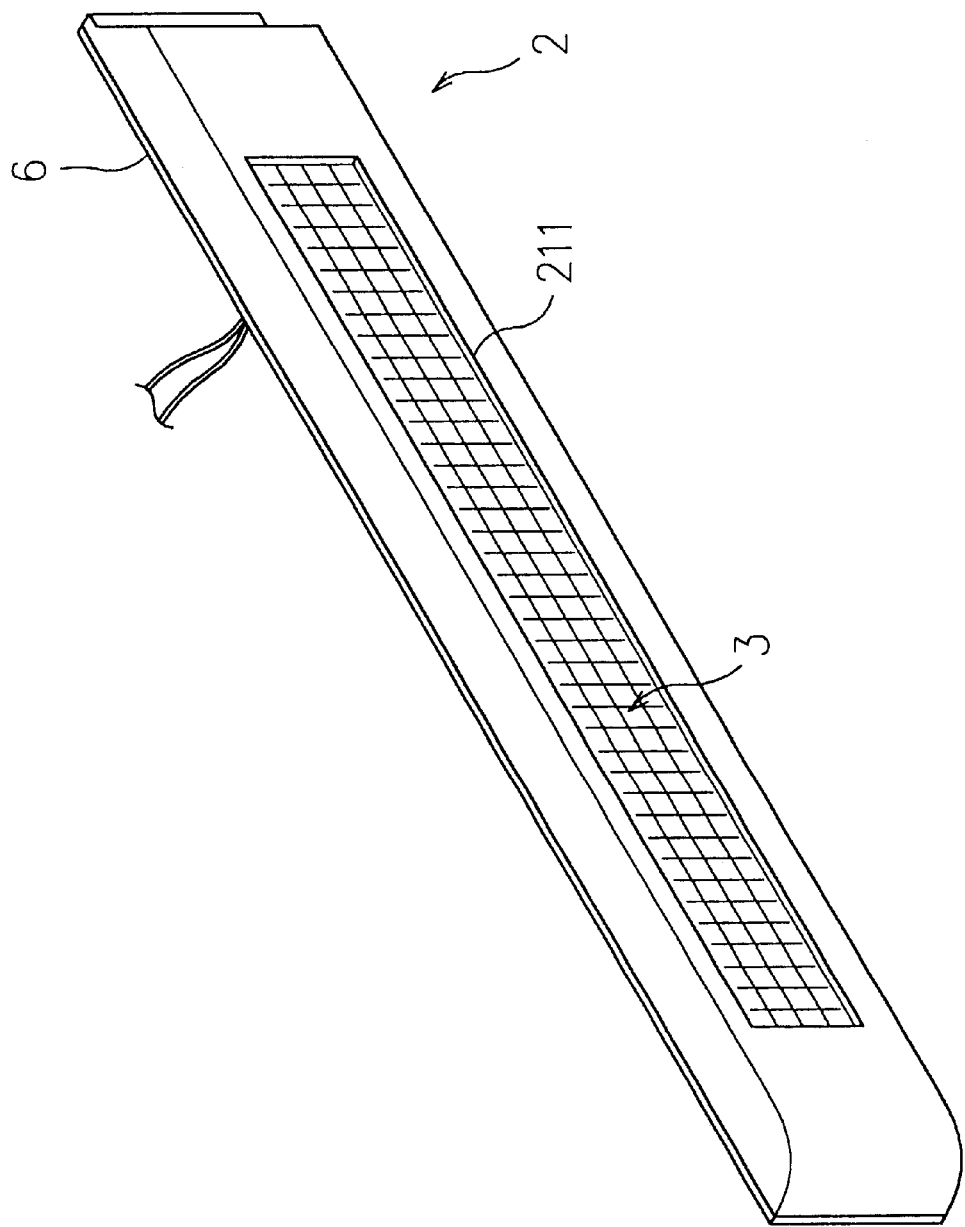
FIG. 1 is a perspective view of the rubbing strip of the present invention.
Figure 2:
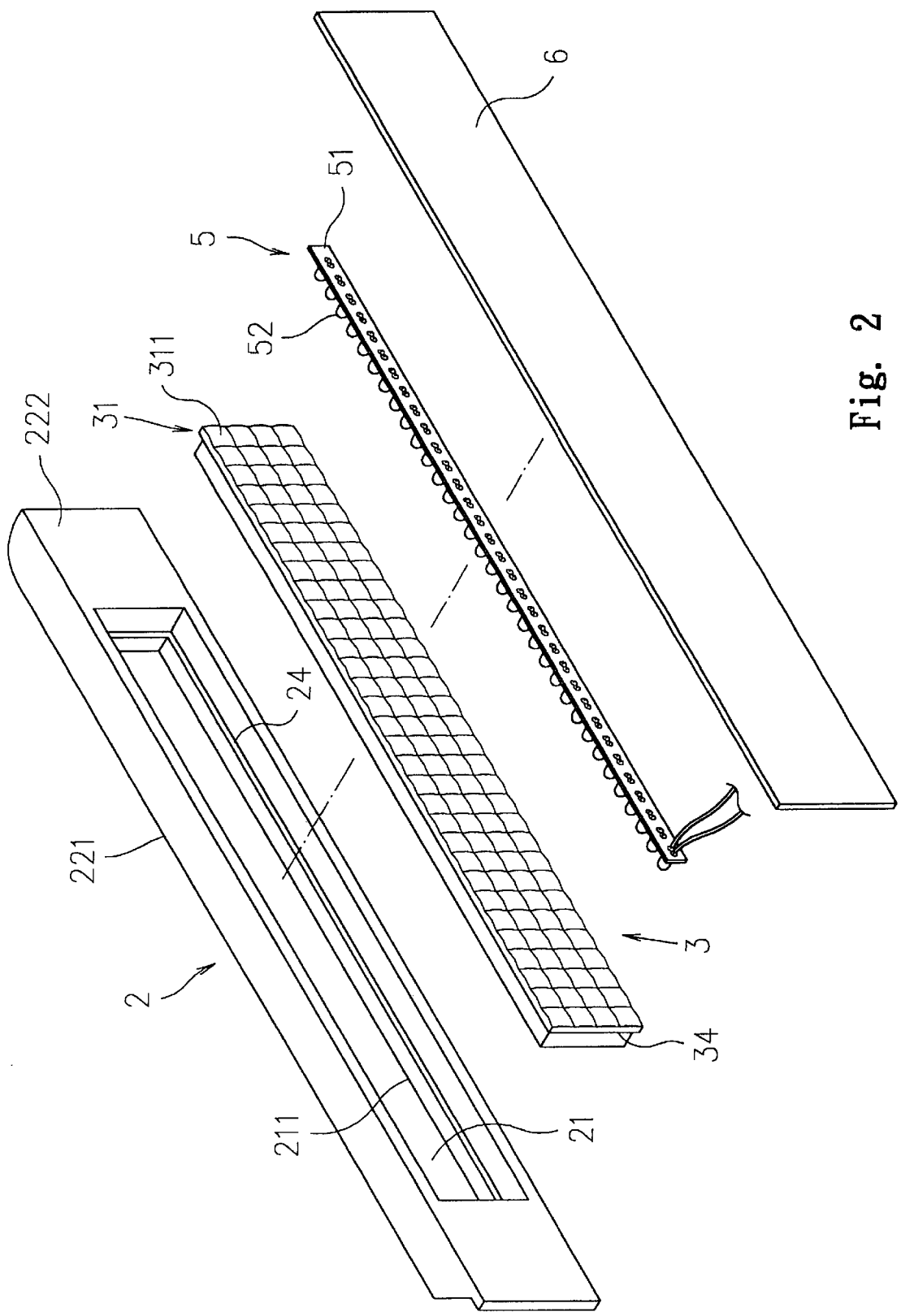
FIG. 2 is an exploded perspective view of the rubbing strip in FIG. 1.
Figure 3:
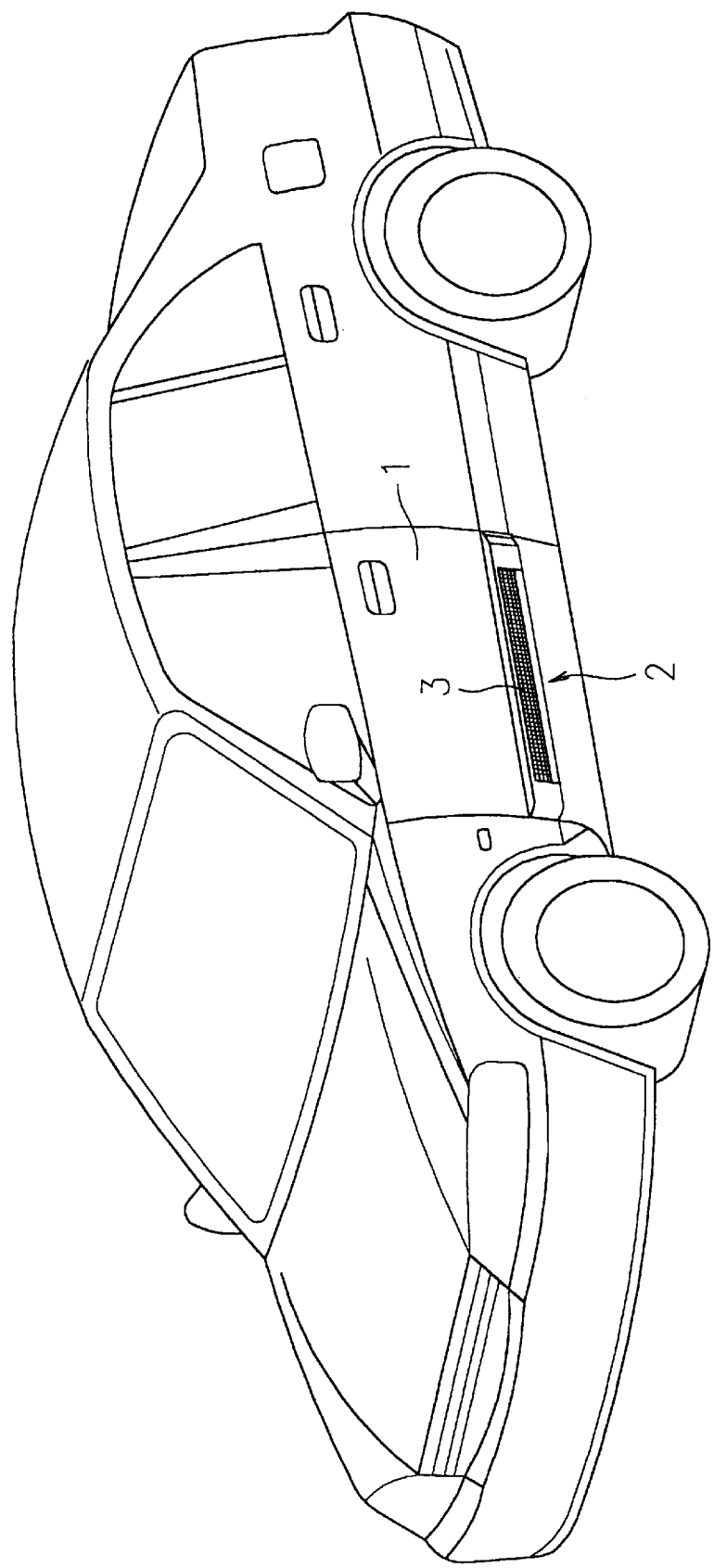
FIG. 3 is a schematic view showing the rubbing strip of the invention is attached to a side of a car body.

With reference to FIGS. 1 to 3, the rubbing strip in accordance with the present invention is to be secured to a side face (1) of a car and has a body (2), a transparent cap (3), an illuminating assembly (5) and a cover (6).

The body (2) has a front side (221), a rear side (222), a receiving space (21) with an open end (211) and a first engaging portion (24) formed inside the receiving space (21).

The transparent cap (3) is received in the receiving space (21) of the body (2) and has a reflection area (31) oppositely formed relative to the open end (211) of the body (2) and a second engaging portion (34) formed to correspond to the first engaging portion (24). The reflection area (31) has multiple reflection faces (311) formed to enhance the reflection effect.

The illuminating assembly (5) is also received in the receiving space (21) of the body (2) and located to face the reflection faces (311). The illuminating assembly (5) is composed of multiple light emitting diodes (52) (LED) each mounted on a base (51).

The cover (6) is to be secured to the rear side (222) of the body (2).

When the rubbing strip of the present invention is in assembly, the transparent cap (3) and the illuminating assembly (5) are sequentially received and secured in the receiving space (21) of the body (2). Then the cover (6) is secured to the rear side (222) of the body (2) to securely encase the transparent cap (3) and the illuminating assembly (5) inside the body (2). Thereafter, the LEDs (52) electrically connected with a power source (not shown) of the car are able to illuminate synchronously with the signaling light of the car so as to eliminate blind spots of the coming drivers.

Figure 4:
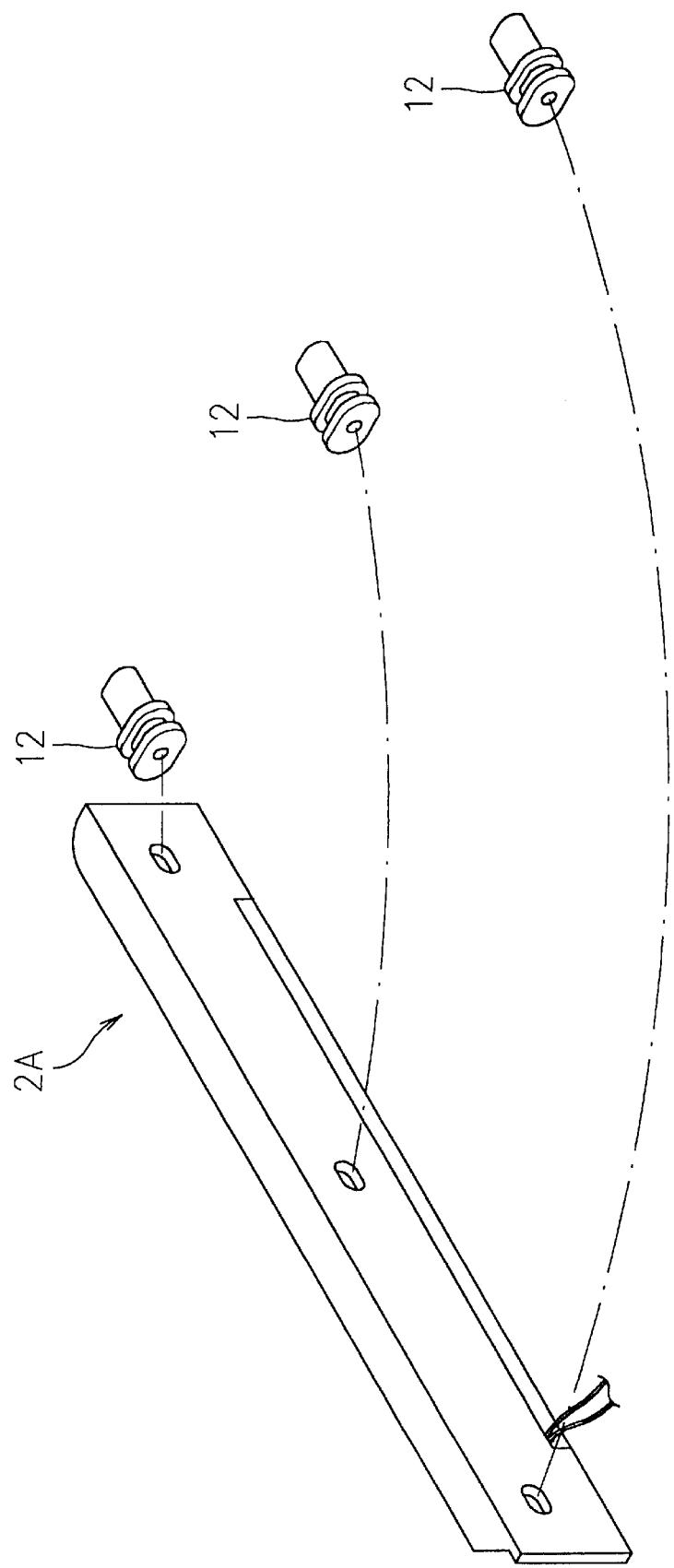
FIG. 4 is a perspective view of the second preferred embodiment of the present invention.

With reference to FIG. 4, the body (2A) of the rubbing strip of the invention is able to be secured to the side face (1) of the car by buttons (12).

Figure 6:
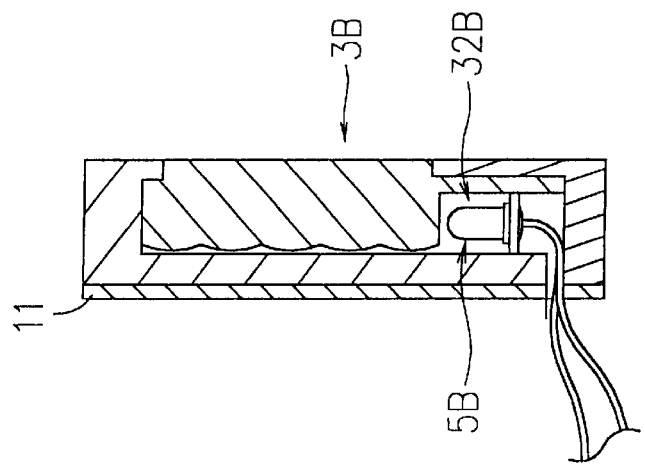
FIG. 6 is a cross sectional view of the rubbing strip in FIG. 5.
Figure 5:
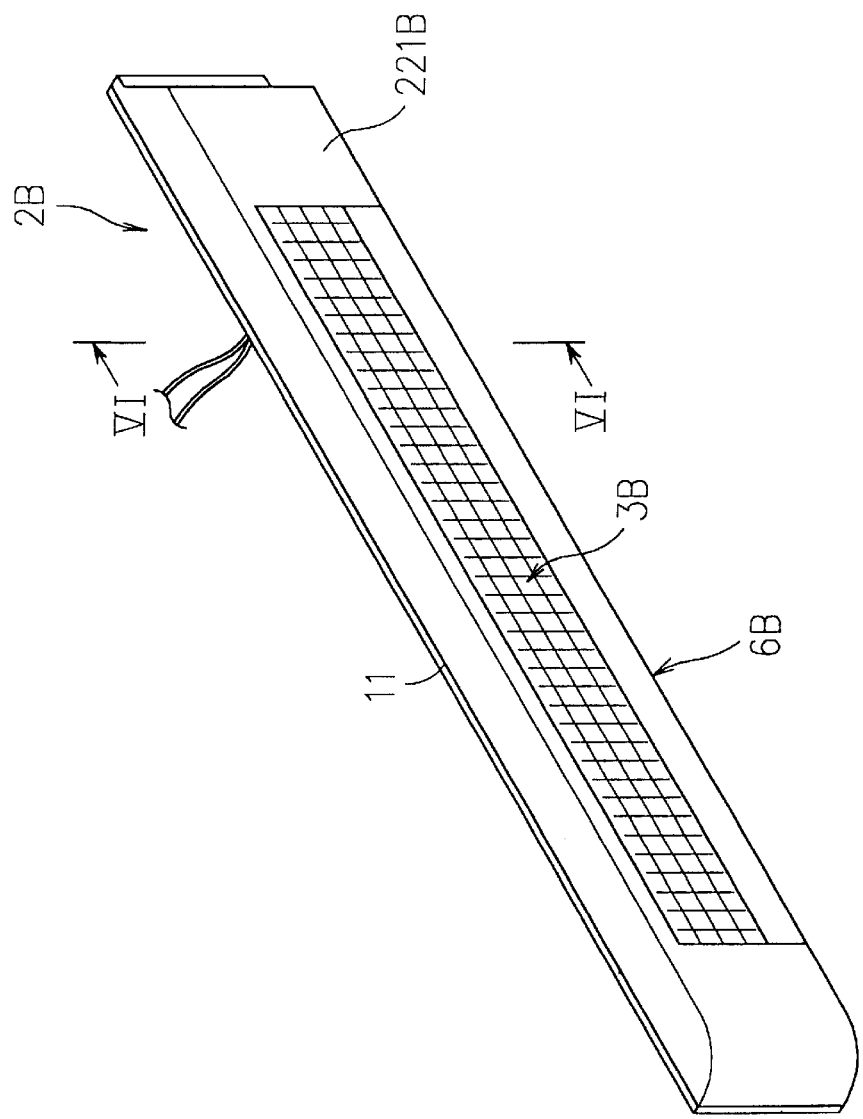
FIG. 5 is a perspective view of the third preferred embodiment of the present invention.
Figure 7:
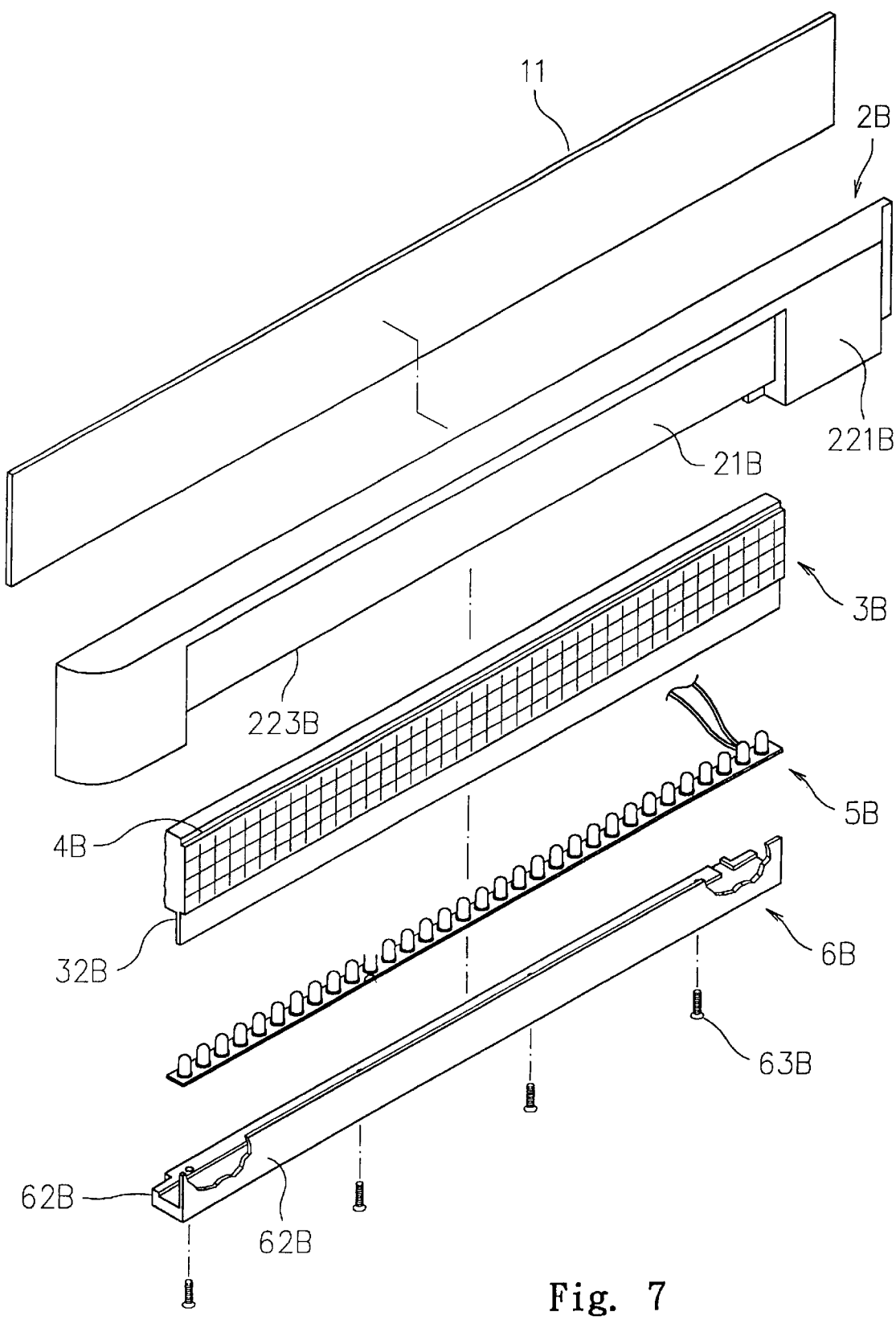
FIG. 7 is an exploded perspective view of the third preferred embodiment in FIG. 5.

With reference to FIGS. 5 to 7, the receiving space (21B) communicates with the front side (221B) and the bottom side (223B) of the body (2B) and extends from the bottom side (223B) to the inside of the body (2B). The transparent cap (3B) is inserted into the receiving space (21B) from the bottom side (223B) of the body (2B) and has a recessed engaging portion (32B) formed to position the illuminating assembly (5B) inside the receiving space (21B) and a securing portion (4B) formed to correspond to the peripheral sides of the body (2B). The cover (6B) has a stop (62B) formed to correspond to the receiving space (21B) of the body (2B). When the rubbing strip of the embodiment is assembled, after the transparent cap (3B) and the illuminating assembly (5B) are sequentially received in the receiving space (21B), the body (2B) is able to be secured to the side face (1) of the car by a double-sided adhesive tape (11).

Figure 8:
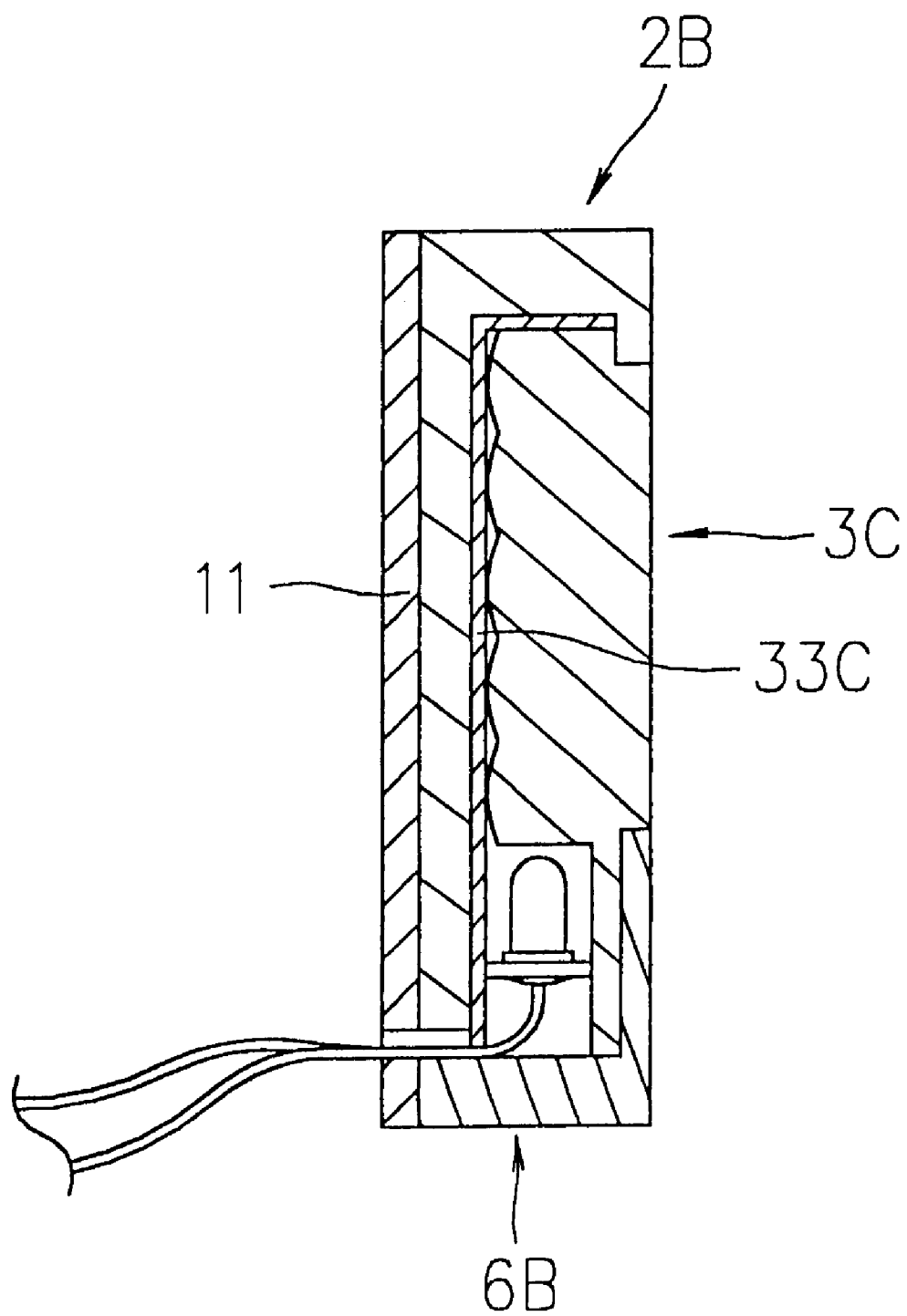
FIG. 8 is a cross sectional view of a fourth preferred embodiment of the present invention.

With reference to FIG. 8, a silver foil (33C) is added between the body (2B) and the transparent cap (3B) to increase the reflection effect.

Figure 9:
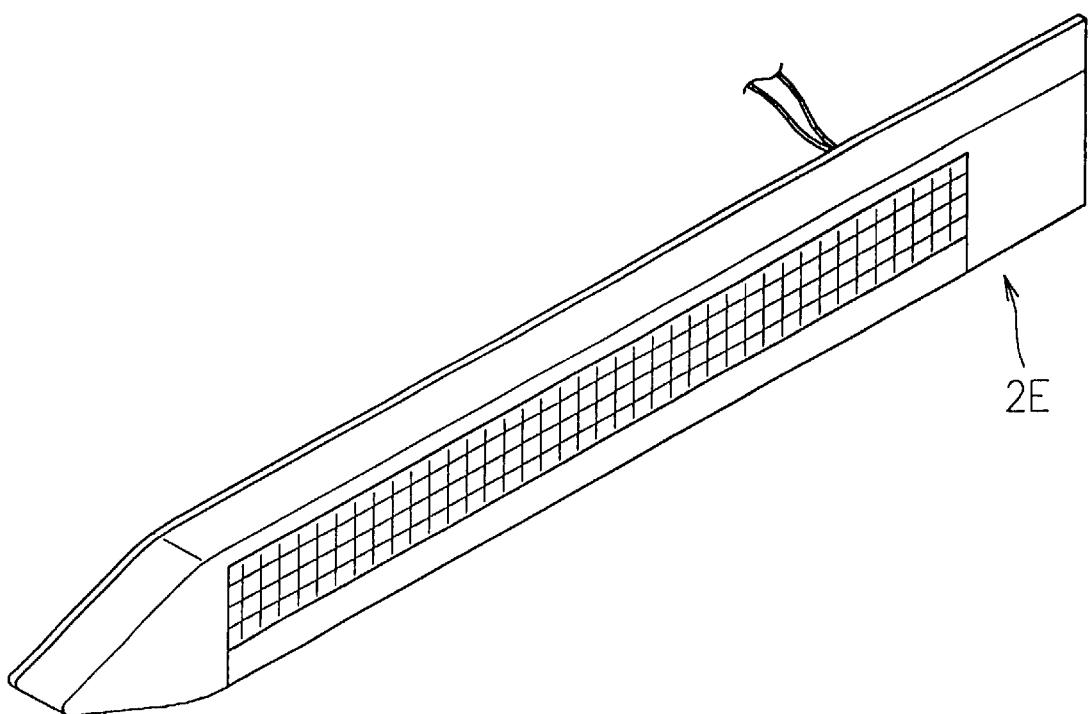
FIG. 9 is a perspective view of a fifth preferred embodiment of the present invention.
Figure 10:
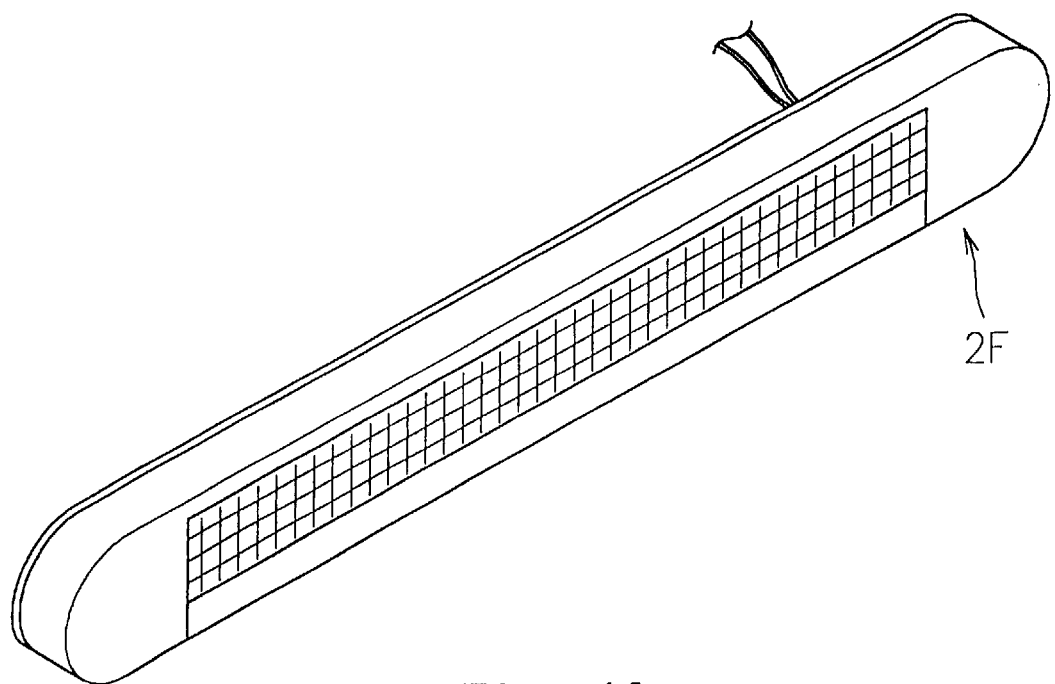
FIG. 10 is a perspective view of a sixth preferred embodiment of the present invention.

With reference to FIGS. 9 and 10, the shape of the body (2E,2F) of the rubbing strip is able to be different to cope with different models of cars.

Accordingly, the rubbing strip of the present invention is able to securely attached to the side face (1) of the car so as to increase the driving safety. Furthermore, due to the light weight and thin thickness characteristics of the rubbing,strip of the present invention, the rubbing strip is able to increase the attraction of the car without damaging the appearance of the car.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rubbing strip for a car, the rubbing strip comprising:
   a body adapted to be secured to a side face of the car and having a receiving space with an open end;
   a transparent cap received in the open end of the receiving space of the body and having a reflection area oppositely formed relative to the open end of the body, the reflection area having multiple reflection faces formed to enhance the reflection effect;
   an illuminating assembly received in the receiving space of the body and located to face the reflection faces, the illuminating assembly being composed of multiple light emitting diodes.

2. The rubbing strip as claimed in claim 1, wherein the light emitting diodes are secured on a base.

3. The rubbing strip as claimed in claim 1, wherein a cover is to be secured to a rear side of the body.

4. The rubbing strip as claimed in claim 3, wherein the receiving space extends from a bottom of the body, wherein the transparent cap is inserted into the receiving space from the bottom of the body, and wherein the cover covers the bottom of the body and has a stop.

5. The rubbing strip as claimed in claim 3, wherein the receiving space communicates with a front side and the rear side of the body, wherein the transparent cap is inserted into the receiving space from the bottom of the body, and wherein the cover covers the bottom of the body.

6. The rubbing strip as claimed in claim 1, wherein the transparent cap has an engaging portion formed to correspond to the illuminating assembly so as to position the illuminating assembly inside the receiving space.

7. The rubbing strip as claimed in claim 1, wherein a silver foil is able to be added between the body and the transparent cap to increase the reflection effect.

8. The rubbing strip as claimed in claim 1, wherein the body is able to be adapted to secure the side face of the car by a double-sided adhesive tape.

9. The rubbing strip as claimed in claim 1, wherein the body is able to be adapted to secure the side face of the car by buttons.

* * * * *